(12) United States Patent
Wong et al.

(10) Patent No.: US 11,050,521 B2
(45) Date of Patent: Jun. 29, 2021

(54) INFRASTRUCTURE EQUIPMENT, METHOD, WIRELESS TELECOMMUNICATIONS SYSTEM, CIRCUITRY AND COMMUNICATIONS DEVICE

(71) Applicant: Sony Corporation, Tokyo (JP)

(72) Inventors: Shin Horng Wong, Basingstoke (GB); Martin Warwick Beale, Basingstoke (GB)

(73) Assignee: SONY CORPORATION, Tokyo (JP)

(*) Notice: Subject to any disclaimer, the term of this patent is extended or adjusted under 35 U.S.C. 154(b) by 90 days.

(21) Appl. No.: 16/344,807

(22) PCT Filed: Oct. 3, 2017

(86) PCT No.: PCT/EP2017/075076
§ 371 (c)(1),
(2) Date: Apr. 25, 2019

(87) PCT Pub. No.: WO2018/082850
PCT Pub. Date: May 11, 2018

(65) Prior Publication Data
US 2020/0059330 A1    Feb. 20, 2020

(30) Foreign Application Priority Data
Nov. 3, 2016 (EP) .................................. 16197188

(51) Int. Cl.
*H04L 1/18* (2006.01)
*H04L 5/00* (2006.01)
*H04W 72/04* (2009.01)

(52) U.S. Cl.
CPC .......... *H04L 1/1887* (2013.01); *H04L 5/0055* (2013.01); *H04W 72/0446* (2013.01)

(58) Field of Classification Search
CPC ... H04L 1/1887; H04L 5/0055; H04L 1/1896; H04L 1/1822; H04L 1/1816; H04W 72/0446

(Continued)

(56) References Cited

U.S. PATENT DOCUMENTS

| | | | |
|---|---|---|---|
| 2015/0229444 A1* | 8/2015 | Webb ................ | H04W 72/1278 370/329 |
| 2016/0164643 A1* | 6/2016 | Loehr ................... | H04L 1/1854 370/336 |
| 2018/0103468 A1* | 4/2018 | Li ........................... | H04L 1/189 |

FOREIGN PATENT DOCUMENTS

| | | |
|---|---|---|
| WO | 2015/018680 A1 | 2/2015 |
| WO | 2018/059986 A1 | 4/2018 |

OTHER PUBLICATIONS

International Search Report and Written Opinion dated Jan. 5, 2018 for PCT/EP2017/075076 filed on Oct. 3, 2017, 11 pages.

(Continued)

*Primary Examiner* — Kwang B Yao
*Assistant Examiner* — Syed M Bokhari
(74) *Attorney, Agent, or Firm* — Xsensus LLP

(57) ABSTRACT

The present disclosure relates to an infrastructure equipment forming part of a wireless telecommunications system. The infrastructure equipment includes transmitter circuitry for transmitting signals representing data via a wireless access interface of the wireless telecommunications system to a communications device, receiver circuitry for receiving signals representing data via the wireless access interface from the communications device, and controller circuitry configured to control the transmitter circuitry and the receiver circuitry to transmit and receive signals via the wireless access interface in accordance with a time divided structure (Continued)

in which the wireless access interface is divided into a plurality of repeating time units.

19 Claims, 9 Drawing Sheets

(58) Field of Classification Search
USPC .................................................. 370/329, 336
See application file for complete search history.

(56) References Cited

OTHER PUBLICATIONS

Holma et al., "LTE for UMTS", OFDMA and SC-FDMA Based Radio Access, System Architecture based on 3GPP SAE, 2009, 11 pages.

Qualcomm Incorporated, "Support for multicast", 3GPP TSG RAN WG1 Meeting No. 86bis R1-1609995, Lisbon, Portugal, Oct. 10-14, 2016, pp. 1-9.

Texas Instruments et al., "Explicit DTX Signaling with ACK/NAK Bundling in TDD", 3GPP TSG RAN WG1 #52bis R1-081373, Shenzhen, China, Mar. 31-Apr. 4, 2008, pp. 1-4.

Sony, "Higher data rate for feMTC", 3GPP TSG RAN WG1 Meeting No. 86 R1-166660, Gothenburg, Sweden, Aug. 22-26, 2016, 5 pages.

NTT DOCOMO, "Views on techniques to improve the data rate for Rel-14 MTC", 3GPP TSG RAN WG1 Meeting No. 86 R1-167352, Gothenburg, Sweden Aug. 22-26, 2016, pp. 1-4.

Ericsson, "HARQ-ACK bundling for MTC", 3GPP TSG-RAN WG1 #86bis R1-1610390, Lisbon, Portugal, Oct. 10-14, 2016, 5 pages.

Ericsson, "New WI proposal on Further Enhanced MTC", 3GPP TSG RAN Meeting No. 72 RP-161321 revision of RP-161319, Busan, Korea, Jun. 13-16, 2016, 7 pages.

Vodafone et al., "New work item proposal: Enhancements of NB-IoT", 3GPP TSG RAN Meeting No. 72 RP-161324, Busan, Korea, Jun. 13-16, 2016, 8 pages.

* cited by examiner

INFRASTRUCTURE EQUIPMENT, METHOD, WIRELESS TELECOMMUNICATIONS SYSTEM, CIRCUITRY AND COMMUNICATIONS DEVICE

CROSS-REFERENCE TO RELATED APPLICATION

The present application is based on PCT filing PCT/EP2017/075076 filed Oct. 03, 2017, which claims priority to EP 16197188.2 filed Nov. 03, 2016, the entire contents of each are incorporated herein by reference.

BACKGROUND

Field of Disclosure

The present disclosure relates to infrastructure equipment forming part of a wireless telecommunications system for communicating with a communications device, and specifically to mechanisms for employing half duplex frequency division duplexing (HD-FDD) in such telecommunications systems.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

Third and fourth generation wireless communications systems, such as those based on the third generation partnership project (3GPP) defined UMTS and Long Term Evolution (LTE) architecture are able to support sophisticated services such as instant messaging, video calls as well as high speed internet access. For example, with the improved radio interface and enhanced data rates provided by LTE systems, a user is able to enjoy high data rate applications such as mobile video streaming and mobile video conferencing that would previously only have been available via a fixed line data connection. The demand to deploy third and fourth generation networks is therefore strong and the coverage area of these networks, i.e. geographic locations where access to the networks is possible, is expected to increase rapidly. However, whilst fourth generation networks can support communications at high data rate and low latencies from devices such as smart phones and tablet computers, it is expected that future wireless communications networks will need to support communications to and from a much wider range of devices, including reduced complexity devices, machine type communication (MTC) devices, enhanced MTC (eMTC) devices, wearable devices, devices which require little or no mobility, high resolution video displays and virtual reality headsets. As such, the supporting of such a wide range of communications devices, and the device-to-device (D2D) communications between them, can represent a technical challenge for a wireless communications network.

A current technical area of interest to those working in the field of wireless and mobile communications is known as "The Internet of Things" or IoT for short. The 3GPP has proposed to develop technologies for supporting narrow band (NB)-IoT using an LTE or 4G wireless access interface and wireless infrastructure. Such IoT devices are expected to be low complexity and inexpensive devices requiring infrequent communication of relatively low bandwidth data. It is also expected that there will be an extremely large number of IoT devices which would need to be supported in a cell of the wireless communications network. Furthermore such NB-IoT devices are likely to be deployed indoors and/or in remote locations making radio communications challenging. A similar class of devices is the Further Enhanced MTC (fe-MTC) [3]. Current areas of development are aimed at improving the operation of these types of low cost devices so that they are power efficient and can operate in extended coverage, such as inside basements [2][4]. One of the desires is to increase the throughput of the IoT devices, especially for devices using half-duplex frequency division duplexing (HD-FDD).

SUMMARY OF THE DISCLOSURE

Embodiments of the present invention provide an infrastructure equipment forming part of a wireless telecommunications system. The infrastructure equipment comprises transmitter circuitry for transmitting signals representing data via a wireless access interface of the wireless telecommunications system to a communications device, receiver circuitry for receiving signals representing data via the wireless access interface from the communications device, and controller circuitry configured to control the transmitter circuitry and the receiver circuitry to transmit and receive signals via the wireless access interface in accordance with a time divided structure in which the wireless access interface is divided into a plurality of repeating time units. The controller circuitry is configured in combination with the transmitter circuitry and receiver circuitry to transmit, in a first repetition of the time units, a plurality of control channels configured to schedule a plurality of data channels configured to carry data, the data channels being divided into a plurality of bundles each comprising a plurality of the data channels, to transmit, in the first repetition of the time units, one or more of the plurality of bundles, and to re-transmit the data, in a second repetition of the time units, for at least a first of the bundles and a second of the bundles, one or more of the data channels of the first of the bundles being swapped for re-transmission with one or more of the data channels of the second of the bundles. In some embodiments of the present disclosure, the controller circuitry is configured to control the receiver circuitry to receive from the communications device a negative acknowledgement for each of one or more of the bundles indicating that one or more of the data channels of each of the plurality of bundles for which the negative acknowledgement was received has not been successfully received by the communications device, wherein the bundles for which the negative acknowledgements were received comprises the first bundle and the second bundle.

Embodiments of the present invention provide systems and methods to reduce the retransmission inefficiency of HARQ-ACK bundling. Various further aspects and features of the present technique are defined in the appended claims, which include an infrastructure equipment, a method of operating an infrastructure equipment, circuitry for an infrastructure equipment, a wireless telecommunications system and a communications device.

The foregoing paragraphs have been provided by way of general introduction, and are not intended to limit the scope of the following claims The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Conventional Communications System

Figure 1:
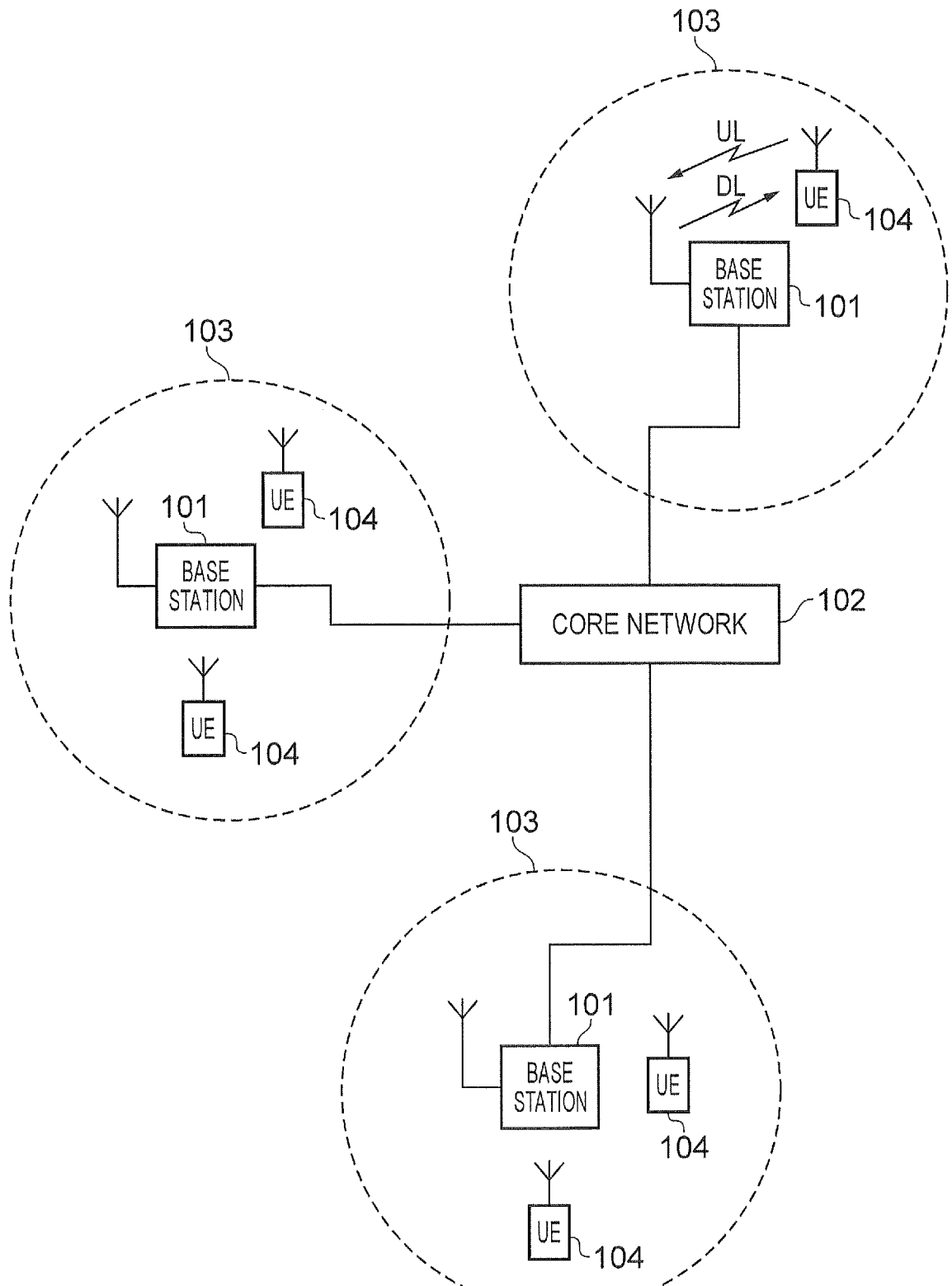
FIG. 1 is a schematic block diagram illustrating an example of a mobile telecommunication system.

FIG. 1 provides a schematic diagram illustrating some basic functionality of a mobile telecommunications network/system operating in accordance with LTE principles and which may be adapted to implement embodiments of the disclosure as described further below. Various elements of FIG. 1 and their respective modes of operation are well-known and defined in the relevant standards administered by the 3GPP (RTM) body, and also described in many books on the subject, for example, Holma H. and Toskala A [1]. It will be appreciated that operational aspects of the telecommunications network which are not specifically described below may be implemented in accordance with any known techniques, for example according to the relevant standards.

The network 100 includes a plurality of base stations 101 connected to a core network 102. Each base station provides a coverage area 103 (i.e. a cell) within which data can be communicated to and from communications devices 104. Data is transmitted from base stations 101 to communications devices 104 within their respective coverage areas 103 via a radio downlink. Data is transmitted from communications devices 104 to the base stations 101 via a radio uplink. The uplink and downlink communications are made using radio resources that are licensed for exclusive use by the operator of the network 100. The core network 102 routes data to and from the communications devices 104 via the respective base stations 101 and provides functions such as authentication, mobility management, charging and so on. Communications devices may also be referred to as mobile stations, user equipment (UE), user device, mobile radio, and so forth. Base stations may also be referred to as transceiver stations/infrastructure equipment/NodeBs/eNodeBs (eNB for short), and so forth.

Wireless communications systems such as those arranged in accordance with the 3GPP defined Long Term Evolution (LTE) architecture use an orthogonal frequency division modulation (OFDM) based interface for the radio downlink (so-called OFDMA) and a single carrier frequency division multiple access scheme (SC-FDMA) on the radio uplink.

Mobile communications networks may further include relay nodes, to try to extend a radio coverage area provided by the network to reach communications devices which would otherwise be out of range of the mobile communications network or to improve the ratio of successful transmissions between a terminal and a base station. Relay nodes further allow power consumption at the terminal to be reduced, as the range of transmission for that terminal will be reduced.

Hybrid Automatic Repeat Request (HARQ)

Figure 2:
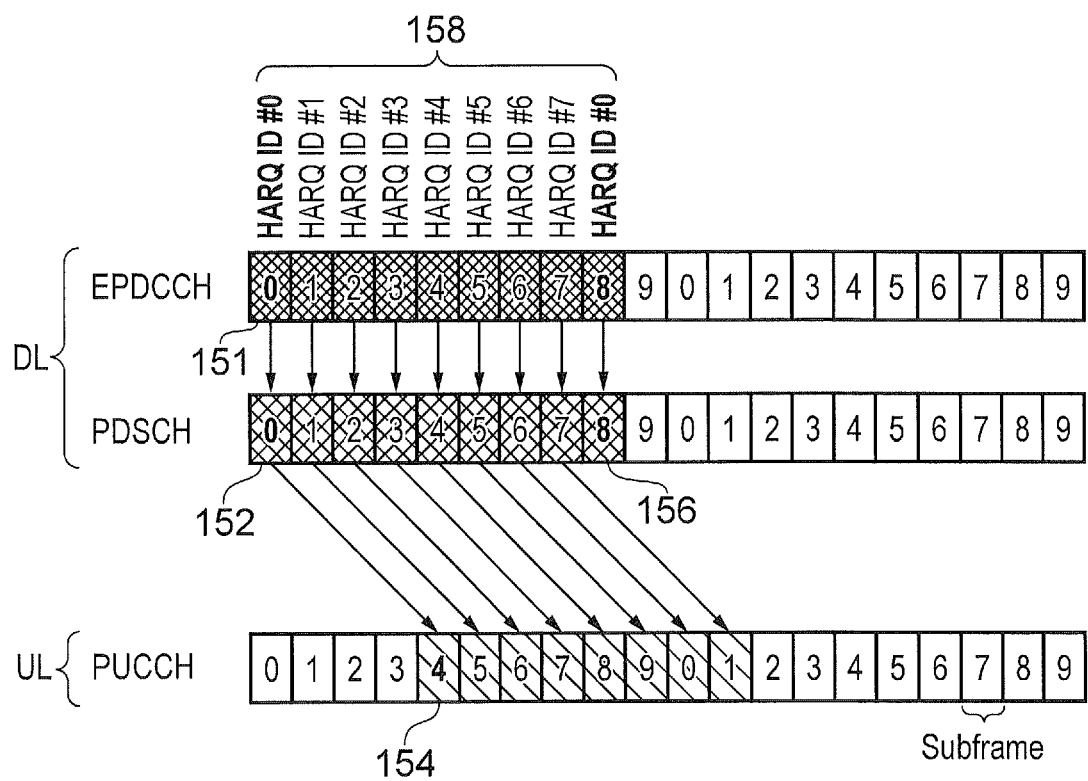
FIG. 2 illustrates an example of a transmission of HARQ processes for a FD-FDD system.

In a HARQ transmission, a transport block (TB), e.g. such as a PDSCH TB, occupies a HARQ process where each HARQ process consists of the transmission of the TB and an acknowledgement to that TB. If a NACK is fed back, a retransmission for that TB occurs otherwise a new TB occupies this HARQ Process. A HARQ transmission for a full-duplex frequency division duplexing (FD-FDD) system, in which transmission and reception can occur contemporaneously, is shown in FIG. 2 for LTE where the HARQ processes with ID #0 consists of an EPDCCH 151 & the corresponding PDSCH 152 in Subframe 0. The UE takes 3 subframes to process the EPDCCH & PDSCH and prepare to transmit the acknowledgement carried by a PUCCH 154 in subframe 4. The eNB then takes another 3 subframes to process and prepare for another PDSCH 156 for the HARQ process ID #0 (a retransmission or new TB) in subframe 8. The round trip time 158 for LTE as shown in FIG. 2 is 8 ms and during this time, additional HARQ processes (i.e. ID #1 to ID #7) can be transmitted to fully utilise the resources thereby maximising the throughput.

HD-FDD UEs and Telecommunications Systems

A half-duplex frequency division duplexing (HD-FDD) UE can either receive or transmit, but cannot perform both at the same time. It also needs to switch between frequency bands when it switches between transmitting and receiving. In Rel-13 eMTC, the HD-FDD UE is expected to take 1 ms (i.e. one subframe) to switch between receive and transmit (downlink (DL) to uplink (UL)) and 1 ms (i.e. one subframe) to switch from transmit to receive (UL to DL). In Rel-13 eMTC, cross subframe scheduling is used for a physical downlink shared channel (PDSCH), in which an MTC-physical downlink control channel (MPDCCH) carrying downlink control information (DCI) for a downlink grant is transmitted in subframe n and the corresponding scheduled PDSCH is transmitted in subframe n+2 (shown by 206 in FIG. 3). Once the UE receives the PDSCH, it has three subframes to decode, generate a feedback (acknowledgement or negative acknowledgement (ACK/NACK)) and transmit this feedback with timing advance, i.e. it needs to transmit the physical uplink control channel (PUCCH) carrying the HARQ feedback in subframe n+6; two subframes (shown by 206 in FIG. 3) between MPDCCH and PDSCH, plus four subframes (shown by 208 in FIG. 3) between PDSCH and PUCCH.

Figure 3:
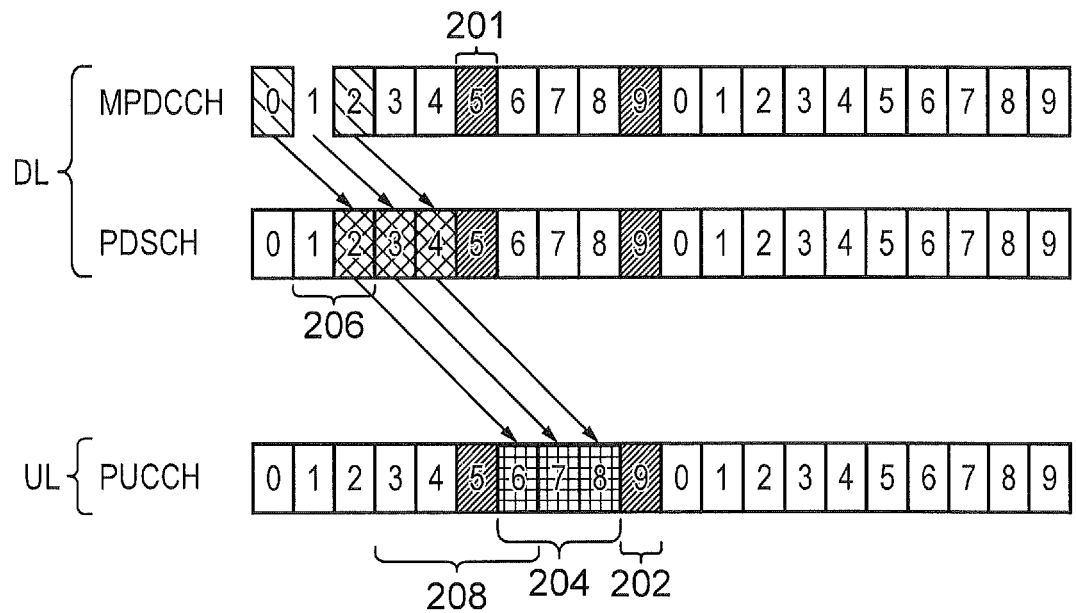
FIG. 3 illustrates an example of a Rel-13 eMTC HD-FDD PDSCH transmission.

An example of this is shown in FIG. 3, where in subframe 0, an MPDCCH carrying a downlink grant is transmitted and this is followed by a PDSCH in subframe 2. The UE would then transmit the PUCCH carrying the HARQ feedback 204 in subframe 6. DL to UL switching 201 for the transmitting device takes place in subframe 5, and UL to DL switching 202 for the receiving device takes place in subframe 9. In order to achieve peak throughput, an HD-FDD UE needs to transmit as many contiguous PDSCH as possible. Due to the timing constraints described, the HD-FDD UE can only transmit three contiguous PDSCH per radio frame (i.e. 10 subframes) as shown in FIG. 3. Since the maximum TBS (Transport Block Size) in Rel-13 eMTC is 1000 bits, the maximum downlink throughput that can be achieved by an HD-FDD UE is 300 kbps.

One of the methods to improve HD-FDD throughput is to introduce HARQ Feedback (HARQ-ACK) Bundling, where a single PUCCH (ACK/NACK) is used to acknowledge more than one PDSCH, i.e. a bundle of PDSCHs. An AND operation is used for the feedback; that is the UE sends:

An ACK if all of the PDSCHs in the bundle pass the CRC check; or

A NACK if one or more PDSCHs in the bundle fail the CRC check.

A known inefficiency of HARQ-ACK bundling is that if the eNB receives a NACK, it would not know which of the PDSCH(s) in the bundle failed to reach the UE since an AND operator is used for the feedback. In this case, the eNB has to retransmit all the PDSCH in the bundle.

Figure 4:
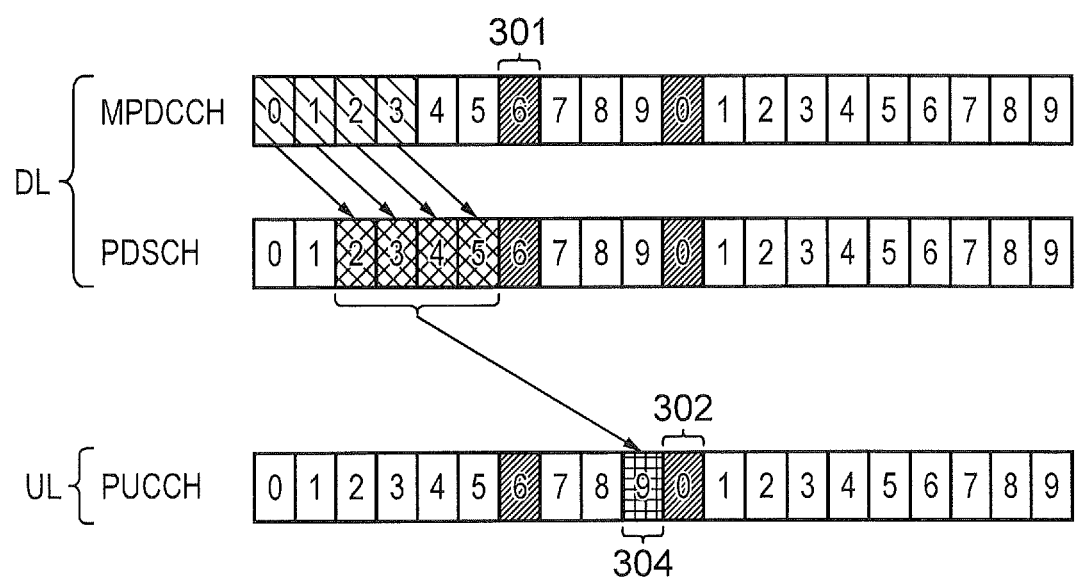
FIG. 4 illustrates an example of HARQ-ACK bundling with 4-PDSCH bundles in a Rel-13 eMTC HD-FDD PDSCH transmission.

In using HARQ-ACK bundling in fe-MTC, the four subframes timing relationship between PDSCH and PUCCH needs to be changed. For example in FIG. 4, a HARQ-ACK bundle size of 4 PDSCHs is used and here the PDSCH transmitted in subframe 2, 3 and 4 would not be able to provide the feedback four subframes later. In [4], it is suggested that only the last PDSCH in the PDSCH bundle (i.e. the PDSCH in subframe 5 of FIG. 4) conforms to the 4 subframe timing. That is the PUCCH is provided 4 subframes later after the last PDSCH in the PDSCH bundle (i.e. PUCCH providing the feedback 304 is transmitted in subframe 9 in FIG. 4). DL to UL switching 301 for the transmitting device takes place in subframe 6, and UL to DL switching 302 for the receiving device takes place in subframe 0 in the following radio frame. As shown in FIG. 4, using HARQ-ACK bundle size of 4, the UE maximum downlink throughput is increased to 364 kbps (assuming a maximum downlink TBS of 1000 bits).

Figure 5:
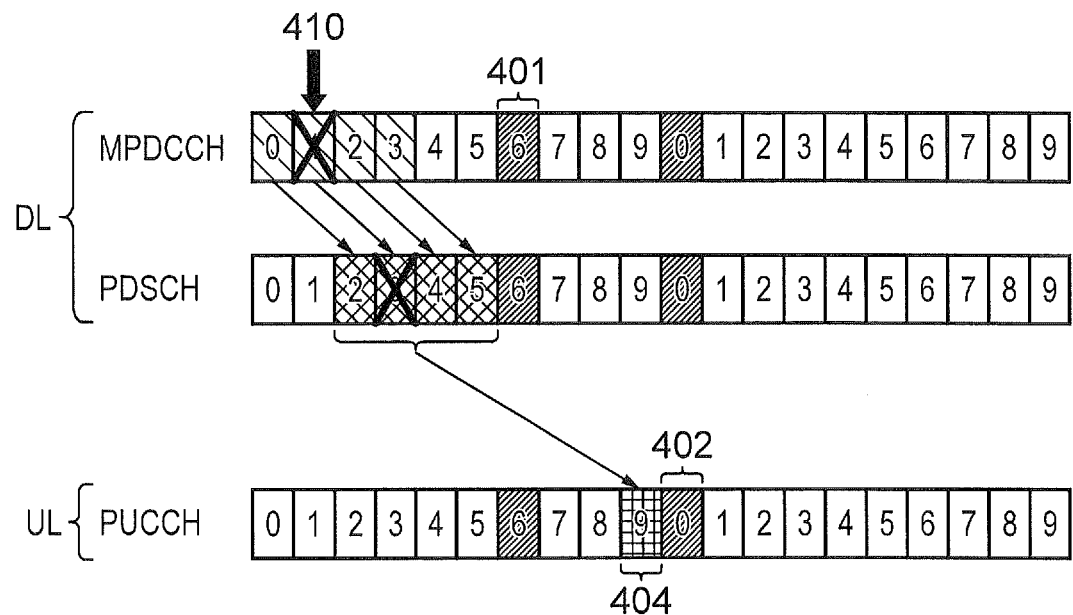
FIG. 5 illustrates an example of a missed MPDCCH detection in a PDSCH bundle transmitted as shown in FIG. 4.

As described previously, when a NACK is received, the eNB does not know which PDSCH(s) in the bundle is (are) not received correctly and it has to retransmit the entire bundle. Another issue with HARQ-ACK bundling is, even if an ACK is received, the eNB is not sure if the UE has received all the PDSCHs in the bundle since the UE may have missed one or more PDSCHs. For example in FIG. 5, an eNB transmits a bundle of four PDSCHs in subframes 2, 3, 4 & 5, which are scheduled by four corresponding MPDCCHs in subframes 0, 1, 2 & 3. Since the targeted block error rate (BLER) for MPDCCH is 1%, it is possible that the UE missed the detection of an MPDCCH. In this example, the UE missed MPDCCH 410 in subframe 1 thereby it will not decode PDSCH in subframe 3. The UE decodes the remaining PDSCHs (in subframe 2, 4 & 5) correctly and hence would feedback an ACK 404 in subframe 9 even though PDSCH in subframe 3 was not decoded. Again, in FIG. 5, DL to UL switching 401 for the transmitting device takes place in subframe 6, and UL to DL switching 402 for the receiving device takes place in subframe 0 in the following radio frame.

Figure 6:
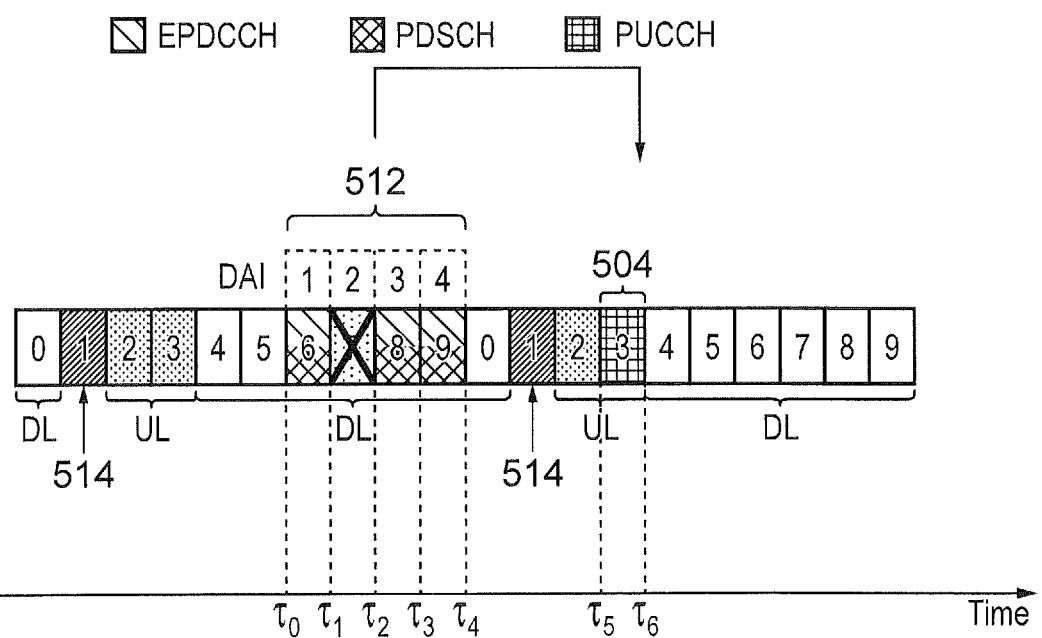
FIG. 6 illustrates a first example of a Downlink Assignment Index in LTE TDD.

HARQ-ACK bundling is employed in LTE time division duplexing (LTE TDD). In LTE TDD, the subframes used for uplink and downlink transmission are configured based on a set of subframe configurations. For each configuration, a HARQ bundling window is defined where any PDSCH scheduled in this window would be bundled for HARQ-ACK bundling. Recognising the missed PDSCH detection issue in HARQ-ACK bundling, in LTE TDD, a Downlink Assignment Index (DAI) is used in the downlink grant in the PDCCH/EPDCCH (downlink control information, DCI) when scheduling each of the PDSCH in the bundle. The DAI is a counter that increases as the number of scheduled PDSCH increases in the bundle. That is, the DAI indicates to the UE that a scheduled PDSCH is the $k^{th}$ PDSCH in the bundle. This enables the UE to determine if any PDSCH is missing in the bundle. An example is shown in FIG. 6, where a UL/DL subframe Configuration 4 is used. One of the fixed HARQ-ACK bundling windows 512 consists of (downlink) subframe 6, 7, 8 & 9 and their corresponding PUCCH carrying the HARQ-ACK 504 bundling is in subframe 3 in the following radio frame. In this example, the eNB transmits EPDCCH in subframe 6, 7, 8 & 9 between time $\tau_0$ and $\tau_4$, which schedules PDSCH in the same subframe. The DAI would indicate "1", "2", "3" and "4" for the PDSCH being scheduled in the DCI carried by the EPDCCH in subframe 6, 7, 8 & 9 respectively. The EPDCCH in subframe 7 (between time $\tau_1$ and $\tau_2$) is not detected by the UE and the corresponding PDSCH in the same subframe 7 is therefore not decoded. However, when the UE receives DCI in subframe 8 and 9 where the DAI indicates 3 and 4 respectively, the UE knows that the PDSCH transmitted in subframe 7 is missing and it would therefore feedback a NACK to the eNB in subframe 3 at time $\tau_5$. A special switching subframe 514 is introduced in place of subframe 1 in each radio frame, used for switching from DL to UL.

Figure 7:
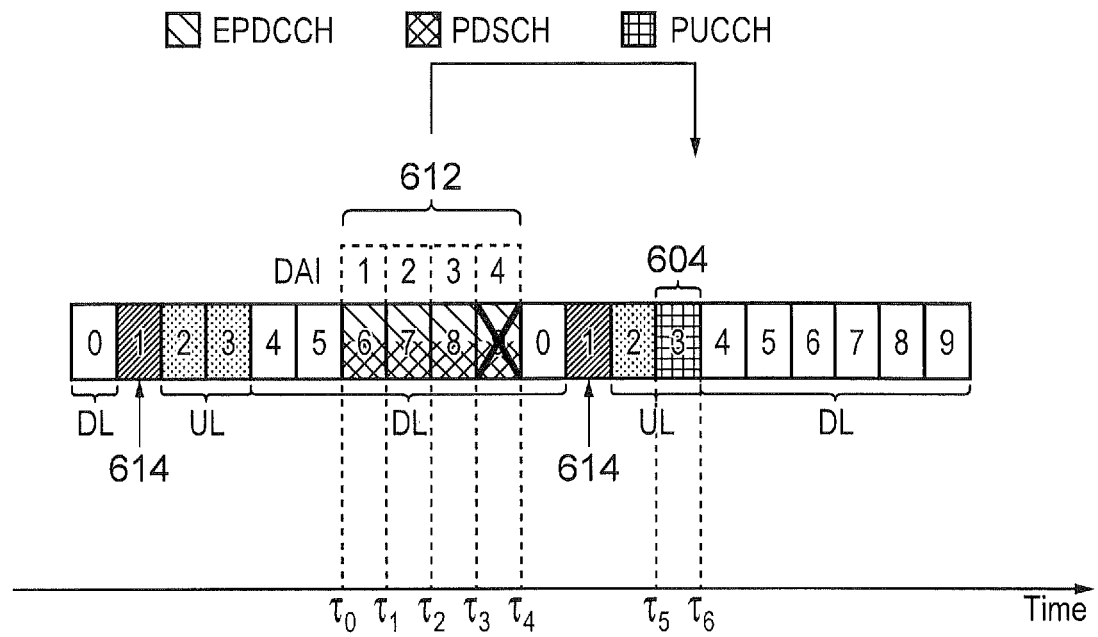
FIG. 7 illustrates a second example of a Downlink Assignment Index in LTE TDD.

The DAI can be used to determine for missing PDSCHs that has already been scheduled in the bundle but it cannot indicate whether the last PDSCH or last few PDSCHs are missing. For example, consider the same LTE TDD Configuration 4 in FIG. 7—with bundling window 612, HARQ-ACK 604 in subframe 3 in the following radio frame, and special subframes 614—where EPDCCH in subframe 9 at time $\tau_3$ is not detected leading to the corresponding PDSCH in subframe 9 not being decoded. The last detected EPDCCH and decoded PDSCH is in subframe 8, transmitted between time $\tau_2$ and $\tau_3$, and the DCI carried by the EPDCCH in subframe 8 indicates that 3 PDSCH has been scheduled leading to the UE to interpret that all PDSCH has been decoded and feedbacks an ACK to the eNB. This potential error scenario is overcome since the resource used to transmit the PUCCH (e.g. the code and frequency resources used in subframe 3 at time $\tau_5$) is a function of the subframe of the last detected PDSCH.

Unlike LTE TDD, fe-MTC HD-FDD does not have a fixed UL/DL subframe configuration, but instead the UE switches from DL to UL when there is an uplink transmission due to an UL grant or for HARQ feedback. Although a PDSCH bundle window similar to LTE TDD was proposed in [5], such a window would introduce restrictions on the eNB scheduling. In [6], a "Toggle Bit" is proposed where a single bit in the DCI would toggle between 0 and 1 for every successive PDSCH scheduled in a PDSCH bundle. This is designed to enable the UE to track for missing PDSCH, i.e. if the UE receives two consecutive 0 s it knows that one PDSCH is missing.

PDSCH Bundle Status (PBS)

Co-pending European patent application EP16191974.1 introduces a PDSCH bundle status (PBS), or bundle status indicator, in the DCI that indicates the status of the MPDCCH/PDSCH bundle transmission to the UE.

The PBS of EP16191974.1 may consist of an End of Bundle (EOB) indicator. This said EOB indicator would tell the UE whether the PDSCH scheduled by the DCI is the last PDSCH within the bundle. This would avoid the UE missing detection of the last MPDCCH and therefore not decode the last PDSCH in a bundle and sending the PUCCH early. If the UE fails to detect the EOB, it would not transmit a PUCCH to the eNB. If a fixed PUCCH and last PDSCH timing is used, e.g. the PUCCH is transmitted 4 subframes after the last PDSCH in the bundle [4], then using the EOB indicator, the UE would avoid switching to the uplink and wasting battery power to transmit a PUCCH to carry the HARQ-ACK. An absence of a HARQ-ACK from the UE would indicate a NACK at the eNB.

The PBS of EP16191974.1 may consist of a Start of Bundle (SOB) indicator. The SOB would indicate the start of a PDSCH bundle to the UE. The SOB can be used together with the EOB, for example if the UE fails to detect an EOB but instead receives a SOB at a later subframe, it would know that the previous PDSCH bundle can be discarded since the eNB failing to detect the HARQ-ACK for the previous bundle would retransmit the PDSCH of that bundle. Although the DAI, if used for fe-MTC, can act as a SOB (e.g. using DAI=00 as the start of bundle), the DAI has a limitation since it is a 2 bit indicator and is used as a counter for PDSCH bundle size greater than 4 by resetting the counter whenever it reaches the max value. It should be appreciated that the EOB need not work together with the SOB.

The PBS indicates either a bitmap indicating which subframes contain PDSCH within the bundle or the number of consecutive PDSCH within the bundle. The UE would transmit an ACK/NACK in a known subframe after the last PDSCH indicated in this PBS.

Figure 8:
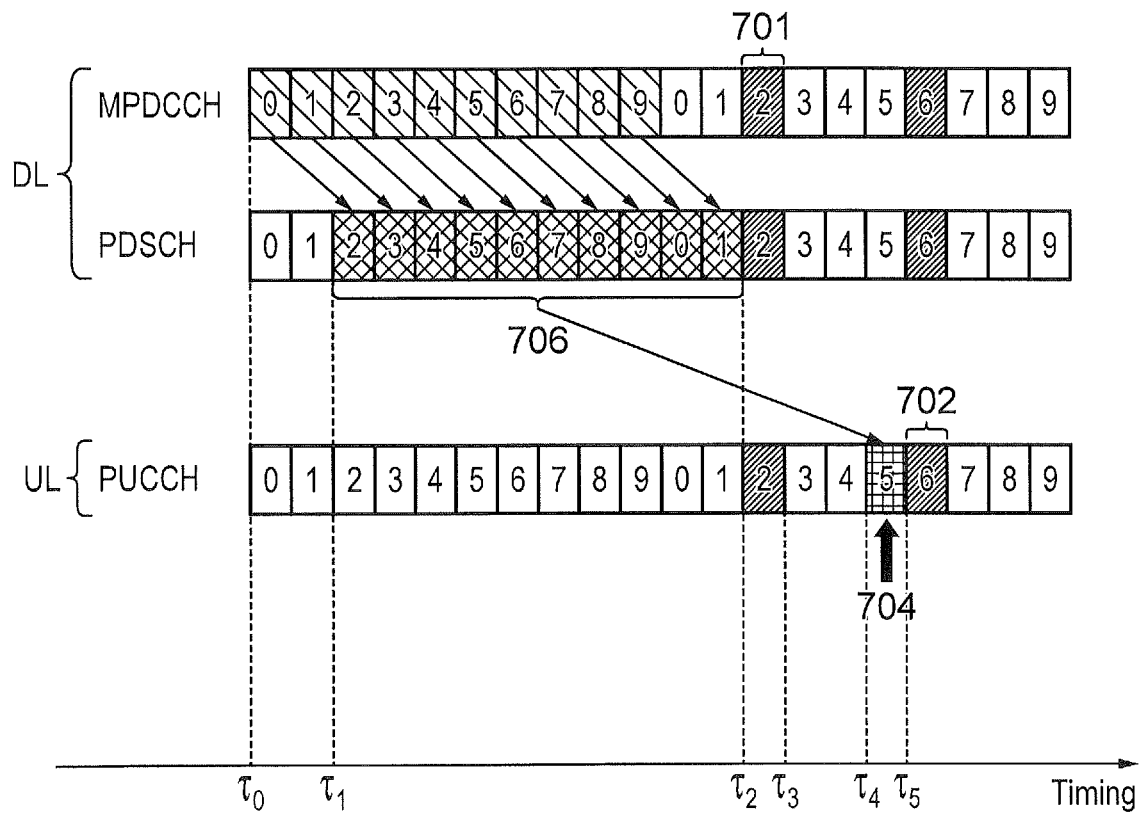
FIG. 8 illustrates an example of a PDSCH transmission for maximum throughput.

The maximum throughput is achieved when PDSCH can be transmitted in consecutive subframes as long as possible, i.e., the largest bundle size would give the highest throughput. The size of the bundle is limited to the number of HARQ processes. In Rel-13 eMTC, the number of HARQ processes is 8, which may be increased to 10 in Rel-14 fe-MTC. Assuming 10 HARQ processes are used, the maximum throughput is achieved when the bundle size is 10 PDSCH as shown in FIG. 8, where a 10 PDSCH bundle 706 occurs between time $\tau_1$ and $\tau_2$ and the HARQ feedback 704 is transmitted in a bundle between time $\tau_4$ and $\tau_5$. For a maximum TBS of 1000 bits, the PDSCH transmissions in FIG. 8 would give a maximum throughput of 588 kbps. In FIG. 8, DL to UL switching 701 for the transmitting device (the infrastructure equipment/eNB) takes place in subframe 2 of the following radio frame, and UL to DL switching 702 for the receiving device (the communications device/UE) takes place in subframe 6 in the following radio frame.

As described above, HARQ-ACK bundling can cause unnecessary retransmission of PDSCH since the eNB does not know which PDSCH(s) has failed when a NACK is received. It is recognised that the inefficiency of this retransmission increases as the size of the bundle increases, i.e. the long bundle 706 shown in FIG. 8 would lead to inefficient retransmission. Hence, it would be beneficial if the long PDSCH transmission can be divided into multiple bundles without introducing additional delay to the timeline shown in FIG. 8. It is observed in FIG. 8 that the subframes between time $\tau_3$ and $\tau_4$ (subframe 3 & 4) leading to the HARQ-ACK feedback are not utilised. These subframes can be used to provide two more additional HARQ-ACK feedbacks without causing any delay to the timeline. That is, the 10 PDSCH transmissions can be divided into three bundles.

Figure 9:
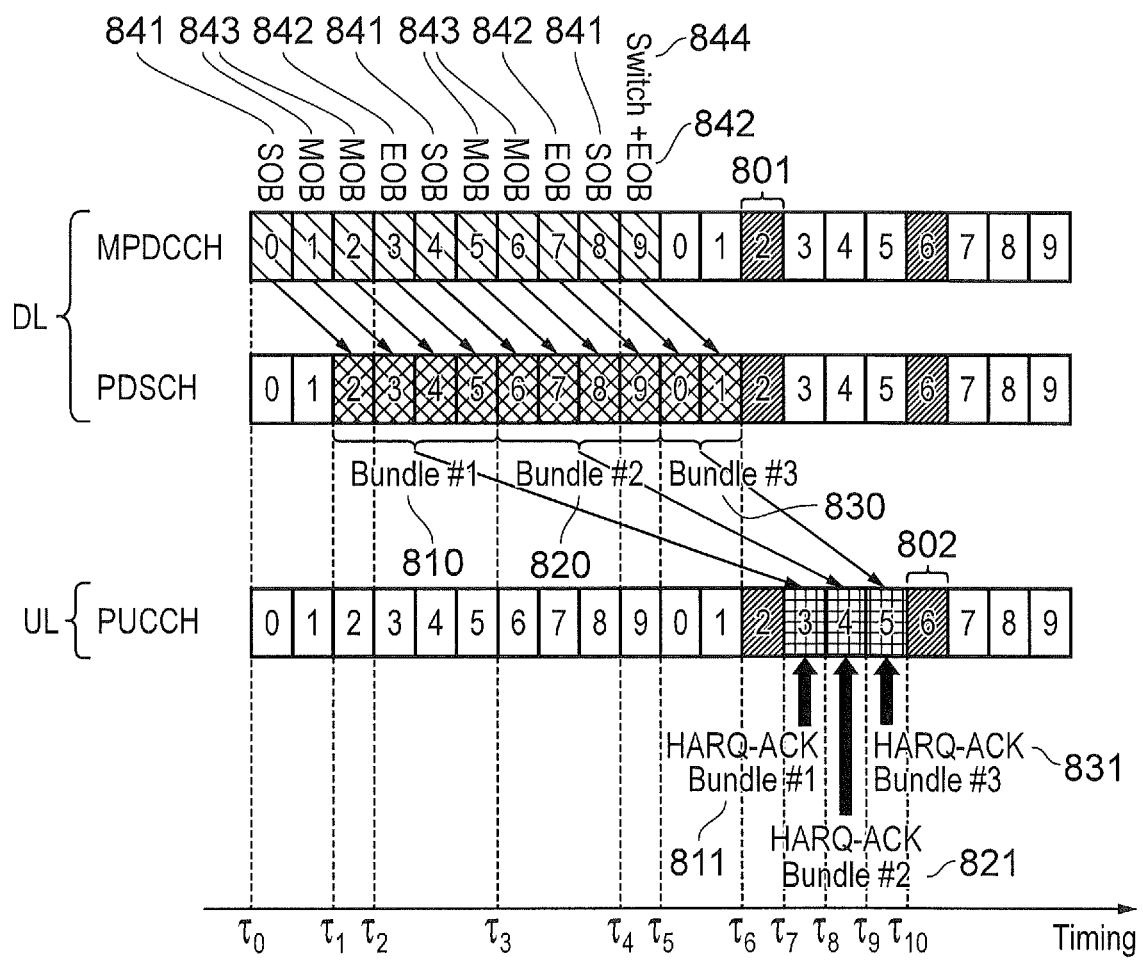
FIG. 9 illustrates an example of a division of PDSCH transmissions into multiple bundles.

An example is shown in FIG. 9, where the 10 PDSCH transmissions are divided into Bundle #1 810, Bundle #2 820 and Bundle #3 830. Bundle #1 810 has a bundle size of 4 PDSCH occupying subframe 2, 3, 4 & 5 between time $\tau_1$ and $\tau_3$, Bundle #2 820 has a bundle size of 4 PDSCH occupying subframe 6, 7, 8 & 9 between time $\tau_3$ and $\tau_5$, and Bundle #3 830 has a bundle size of 2 PDSCH occupying subframe 0 & 1 between time $\tau_5$ and $\tau_6$. The corresponding HARQ-ACK bundling feedbacks 811 (for Bundle #1 810), 821 (for Bundle #2 820) and 831 (for Bundle #3 830) are transmitted between time $\tau_7$ and $\tau_{10}$ in subframe 3, 4, and 5 respectively. This arrangement gives the maximum throughput with reduced retransmission inefficiency. As with the example shown in FIG. 8, in FIG. 9, DL to UL switching 801 for the transmitting device (the infrastructure equipment/eNB) takes place in subframe 2 of the following radio frame, and UL to DL switching 802 for the receiving device (the communications device/UE) takes place in subframe 6 in the following radio frame.

The EOB and SOB indications can be used to indicate the start and end of multiple consecutive bundles shown in FIG. 9. For example the DCI carried by the MPDCCH at time $\tau_0$ scheduling the 1$^{st}$ PDSCH of Bundle #1 810 can include a SOB 841 indicator and the DCI carried by the MPDCCH at time $\tau_2$ (subframe 3) scheduling the last PDSCH of Bundle #1 810 can include an EOB 842 indicator. In this way the UE knows the split of the bundles. However, the UE still needs to know when to switch to the uplink to transmit the HARQ-ACK feedback. It should be appreciated that the concept of "bundle window" as in LTE TDD is not used in HD-FDD.

Recognising this, the PBS of EP16191974.1 may consist of a Switch indicator. This Switch indicator tells the UE when to switch to the uplink to transmit the HARQ-ACK feedback(s). For example in FIG. 9 this Switch indicator 844 (together with an EOB 842) can be transmitted in the DCI at time $\tau_4$, which tells the UE to switch to the uplink after time $\tau_6$, i.e. after the corresponding PDSCH is received. It should be appreciated that the Switch indicator 844 can be transmitted in other subframes when the eNB decides that the UE needs to provide a feedback.

The PBS of EP16191974.1 may consist of a Middle of Bundle (MOB) indicator. This indicator tells the UE that the scheduled PDSCH is neither the end nor the start of the PDSCH bundle and the UE is to expect further PDSCHs. An example is shown in FIG. 9, in the Bundle # 1 810, the MOB 843 is transmitted in DCI carried by the MPDCCH in subframe 1 and 2 (that schedule PDSCH in subframe 3 and 4). The UE would therefore understand that these PDSCH are in the middle of a bundle and expect more PDSCH to come.

It is shown in EP16191974.1 that a high throughput is achieved if the PDSCH can be transmitted in consecutive subframes. As discussed above, with 10 HARQ processes and 1000 bits TBS, the achievable throughput using the PDSCH bundle size of 10 is 588 kbps as shown in FIG. 9.

HARQ Process Exchange in HARQ-ACK Bundling Retransmissions Embodiments of the present invention aim to provide other systems and methods to further reduce the retransmission inefficiency of HARQ-ACK bundling. Such systems and methods involve exchanging HARQ processes between the retransmission of two or more (PDSCH) bundles. This enables the eNB to estimate the HARQ process (i.e. PDSCH) that failed in a bundle.

Figure 10:
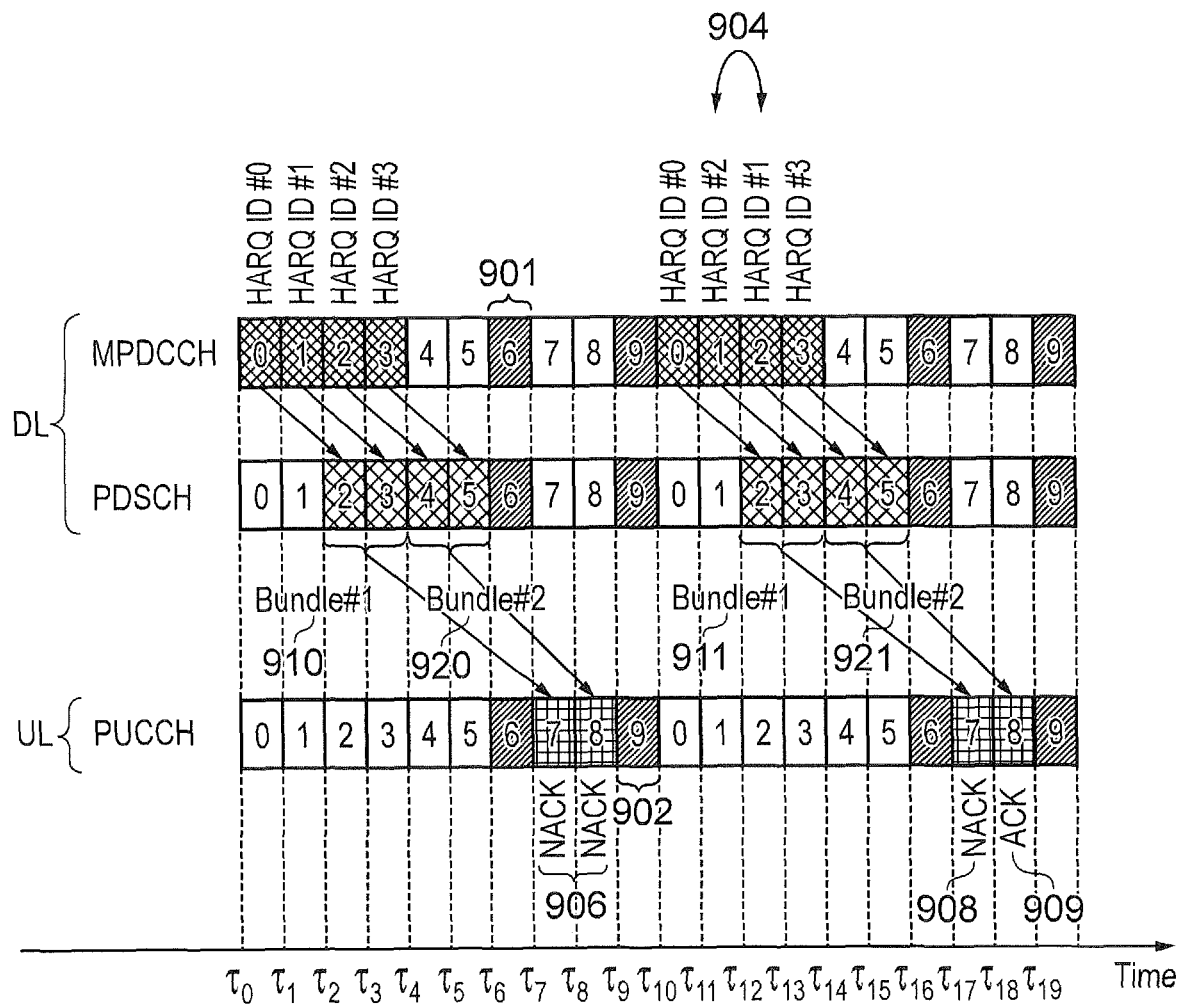
FIG. 10 illustrates an example of an exchange of HARQ processes between retransmissions in accordance with embodiments of the present technique.

FIG. 10 illustrates an example of an exchange of HARQ processes between retransmissions in accordance with embodiments of the present technique. FIG. 10 shows two PDSCH bundles each with a size of 2 PDSCHs, namely Bundle #1 910 and Bundle #2 920. Bundle #1 910 is scheduled by MPDCCHs at time $\tau_0$ & $\tau_1$ whilst Bundle #2 920 is scheduled by MPDCCHs at time $\tau_2$ & $\tau_3$. Bundle #1 910 consists of PDSCHs occupying HARQ Process ID #0 and HARQ Process ID #1 and the first transmissions start at time $\tau_2$ & $\tau_3$ respectively. Bundle #2 920 consists of PDSCHs occupying HARQ Process ID #2 and HARQ Process ID #3 and the first transmissions start at time $\tau_4$ & $\tau_5$ respectively.

Assume that the UE receives the PDSCHs as follows:
PDSCH using HARQ Process ID #0 failed
PDSCH using HARQ Process ID #1 successful
PDSCH using HARQ Process ID #2 failed
PDSCH using HARQ Process ID #3 successful Since an "AND" operation is used to determine the acknowledgement, the UE would feedback two NACKs 906 to the eNB since there is a failed PDSCH reception in each of the two bundles. If the PDSCH in HARQ Process ID #0 and ID #2 continues to fail in a retransmission, then the UE would continue to transmit two NACKs. However, if we swap 904 two of the HARQ Processes as shown in FIG. 10, such that Bundle #1 911 consists of HARQ Process ID #0 and HARQ Process ID #2 whilst Bundle #2 921 consists of HARQ Process ID #1 and HARQ Process ID #3, then in the retransmission that starts at $\tau_{12}$ and $\tau_{14}$ for Bundle #1 911 and Bundle #2 921 respectively, the UE would transmit a NACK 908 for Bundle #1 911 and ACK 909 for Bundle #2 921. By allowing the eNB flexibility to swap HARQ Processes between retransmitted bundles, the inefficiency of retransmission due to HARQ-ACK bundling can be reduced. It should be appreciated that the eNB may have information regarding which of the PDSCH has a higher probability of failure, for example the one with the highest coding rate may have higher probability of failing Hence the eNB may run an algorithm that determines which HARQ processes to swap based on relative probabilities of failure. Since the exchange of HARQ Processes only occurs for retransmitted bundles, even a random exchange of HARQ Processes may yield an improvement.

It will be appreciated that during the re-transmission of the bundles, the UE determines an ACK/NACK status for each HARQ process based on the history of that HARQ process. Considering FIG. 10 and the following reception statuses:

Initial Transmission

Bundle 1: PDSCH using HARQ Process ID #0 failed
Bundle 1: PDSCH using HARQ Process ID #1 successful
Bundle 2: PDSCH using HARQ Process ID #2 failed
Bundle 2: PDSCH using HARQ Process ID #3 successful Re-Transmission Bundle 1: PDSCH using HARQ Process ID #0 failed
Bundle 1: PDSCH using HARQ Process ID #2 failed
Bundle 2: PDSCH using HARQ Process ID #1 failed
Bundle 2: PDSCH using HARQ Process ID #3 successful For the re-transmission, the UE would indicate NACK for Bundle #1 and ACK for Bundle #2 (since for Bundle #2, HARQ process ID 1 was received successfully in the initial transmission and HARQ process ID 3 was received successfully in both the initial and re-transmissions).

In other words, an infrastructure equipment (eNB) in accordance with embodiments of the present technique can be configured to transmit, in a first repetition of the time units, a plurality of control channels configured to schedule a plurality of data channels configured to carry data, the data channels being divided into a plurality of bundles each comprising a plurality of the data channels, to transmit, in the first repetition of the time units, one or more of the plurality of bundles, and to re-transmit the data, in a second repetition of the time units, for at least a first of the bundles and a second of the bundles, one or more of the data channels of the first of the bundles being swapped for re-transmission with one or more of the data channels of the second of the bundles. In embodiments of the present technique, the infrastructure equipment is configured to receive from the communications device, following a detection by the communications device that one or more of the data channels of one or more of the bundles were not successfully received, a negative acknowledgement for each of the one or more of the bundles comprising the one or more data channels that were not successfully received by the communications device, wherein the bundles for which the negative acknowledgement was received comprises the first bundle and the second bundle.

In FIG. 10, DL to UL switching 901 for the transmitting device (the infrastructure equipment/eNB) takes place in subframe 6 of the radio frame, and UL to DL switching 902 for the receiving device (the communications device/UE) takes place in subframe 9 of the radio frame.

According to some example embodiments a Bundle ID is introduced in the DCI. This Bundle ID is used to distinguish one bundle from another. The Bundle ID together with the existing HARQ Process ID in the DCI would therefore indicate which HARQ process ID has been swapped. For example in FIG. 10, the indication in the DCI for the first transmissions is as follows:

DCI transmitted at time $\tau_0$, Bundle ID=1, HARQ Process ID=0
DCI transmitted at time $\tau_1$, Bundle ID=1, HARQ Process ID=2
DCI transmitted at time $\tau_2$, Bundle ID=2, HARQ Process ID=1

DCI transmitted at time $\tau_3$, Bundle ID=2, HARQ Process ID=3

The DCI indication in the retransmissions is as follows

DCI transmitted at time $\tau_0$, Bundle ID=1, HARQ Process ID=0

DCI transmitted at time $\tau_1$, Bundle ID=1, HARQ Process ID=1

DCI transmitted at time $\tau_2$, Bundle ID=2, HARQ Process ID=2

DCI transmitted at time $\tau_3$, Bundle ID=2, HARQ Process ID=3

In other words, the infrastructure equipment is configured to transmit a bundle identifier in one of the control channels, the bundle identifier being associated with one of the bundles. It should be appreciated that the bundle identifier can also indicate that the scheduled PDSCH does not belong to any bundle for cases where the eNB decides not to bundle the PDSCH (e.g. there isn't sufficient data to transmit more than one PDSCH). This bundle identifier may be transmitted to the communications device (UE).

Figure 11:
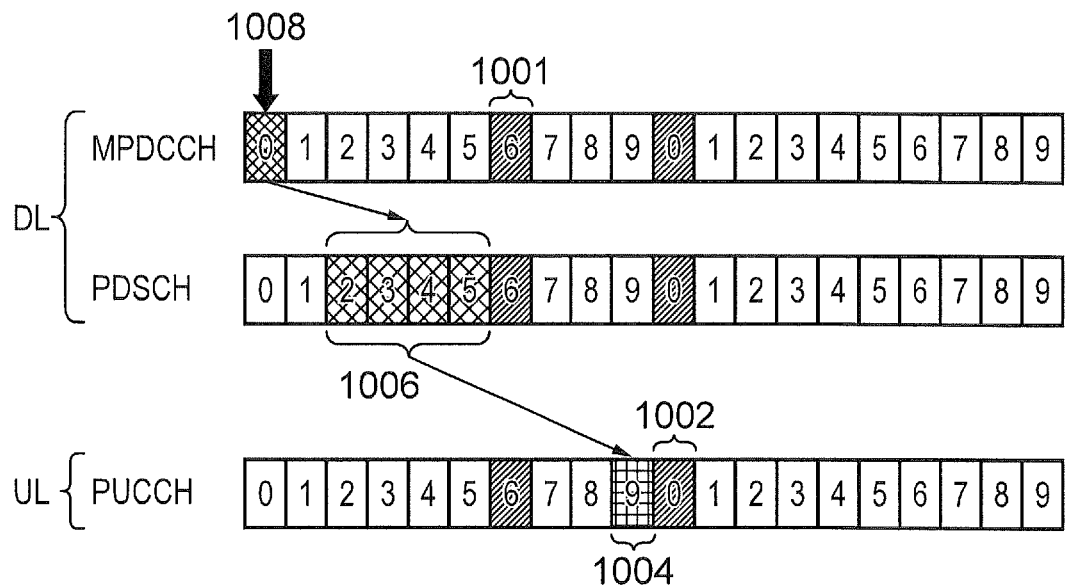
FIG. 11 illustrates an example of a single DCI scheduling a bundle of PDSCHs in accordance with embodiments of the present technique.

In [7], it is proposed that a bundle of PDSCH is scheduled by a single DCI as shown in an example in FIG. 11, where a single DCI carried by a MPDCCH 1008 in subframe 0 would schedule a bundle 1006 containing 4 PDSCHs, and the corresponding HARQ-ACK bundling feedback 1004 is transmitted in subframe 9. The benefit of this scheme is that less control overhead is used and the resources freed using this method can be used for other purposes (e.g. PDSCH can occupy more PRBs).

In other words, each of the control channels is configured to schedule the plurality of the data channels of one of the bundles of data channels. In such embodiments, and where the infrastructure equipment is configured to transmit the bundle identifier in one of the control channels, the bundle identifier is transmitted in the control channel which schedules the bundle with which the bundle identifier is associated. This bundle identifier (bundle ID) may be transmitted to the communications device (UE).

In FIG. 11, DL to UL switching 1001 for the transmitting device (the infrastructure equipment/eNB) takes place in subframe 6 of the radio frame, and UL to DL switching 1002 for the receiving device (the communications device/UE) takes place in subframe 0 of the following radio frame.

It is recognised that the single DCI method in FIG. 11 would require the DCI to indicate multiple HARQ process IDs. For example, if there are 10 HARQ processes, 4 bits are required to indicate the HARQ process ID for each of the PDSCH in the bundle. For a bundle size of 4 PDSCHs, this would require 16 bits.

In some embodiments, the DCI scheduling the first transmission of a bundle (i.e. new PDSCHs) would indicate the HARQ Process ID of one of the predetermined PDSCH (positions) in the bundle, for example, the first PDSCH in the bundle using the 4 bit HARQ Process ID field. The HARQ Process ID of the remaining PDSCH will be the free HARQ Processes of the UE. For example, a UE HARQ process occupancy is shown in Table I below where HARQ Process ID #0, ID #1, ID #4 and ID #5 are not used. In the example presented here, assuming the bundle size is four PDSCHs and the DCI HARQ Process ID field indicates ID #4. The UE would allocate the PDSCH to the HARQ processes as follows:

$1^{st}$ PDSCH occupies HARQ Process ID #4
$2^{nd}$ PDSCH occupies HARQ Process ID #5
$3^{rd}$ PDSCH occupies HARQ Process ID #0
$4^{th}$ PDSCH occupies HARQ Process ID #1

TABLE I

| HARQ process occupancy | | | | | | | | | |
|---|---|---|---|---|---|---|---|---|---|
| ID#0 | ID#1 | ID#2 | ID#3 | ID#4 | ID#5 | ID#6 | ID#7 | ID#8 | ID#9 |
| Free | Free | Used | Used | Free | Free | Used | Used | Used | Used |

In some embodiments, a Swap Bundle ID is indicated in the DCI in the single DCI method. The said Swap Bundle ID would indicate which other bundle the HARQ processes would swap with. In other words, the infrastructure equipment is configured to transmit a bundle swap identifier in one of the control channels, the bundle swap identifier being associated with the second bundle, wherein the one of the control channels is configured to schedule the plurality of data channels of the first bundle. This Swap Bundle ID, or bundle swap identifier, may be transmitted to the communications device (UE).

It should be appreciated that a bundle can have multiple Swap Bundle IDs, i.e. it can swap with more than one other bundles. Indeed, in embodiments of the present technique, if more than one Swap Bundle ID is used, a relationship between the Swap Bundle ID and the HARQ Processes that are swapped can be configured by higher layers. In other words, in embodiments of the present technique the infrastructure equipment is configured to transmit one or more further bundle swap identifiers in the one of the control channels, the one or more further bundle swap identifiers each being associated with one of the bundles which is not scheduled by the one of the control channels. These multiple Swap Bundle IDs, or bundle swap identifiers, may be transmitted to the communications device (UE). In embodiments of the present technique, the infrastructure equipment is configured to swap one or more of the data channels of the first bundle with one or more of the data channels of the second bundle and one or more data channels of a third of the bundles.

In some embodiments, a bitmap is used to indicate which of the PDSCH HARQ processes are swapped. It is agreed in 3GPP that the maximum bundle size is 4, and hence a bitmap of 4 bits can be used in the DCI of the retransmitted bundle to indicate the HARQ processes that have been swapped. It should be noted that a NDI field (New Data Indicator) is currently used in the DCI to indicate whether the PDSCH is a retransmission or a new data. Hence, if the NDI field indicates that it is a retransmission, then the HARQ Process ID field can be reinterpreted as a bitmap of swapped HARQ processes. It should be appreciated that a new field with 4 bits can be added to the DCI instead of reusing the HARQ Process ID field.

Figure 12:
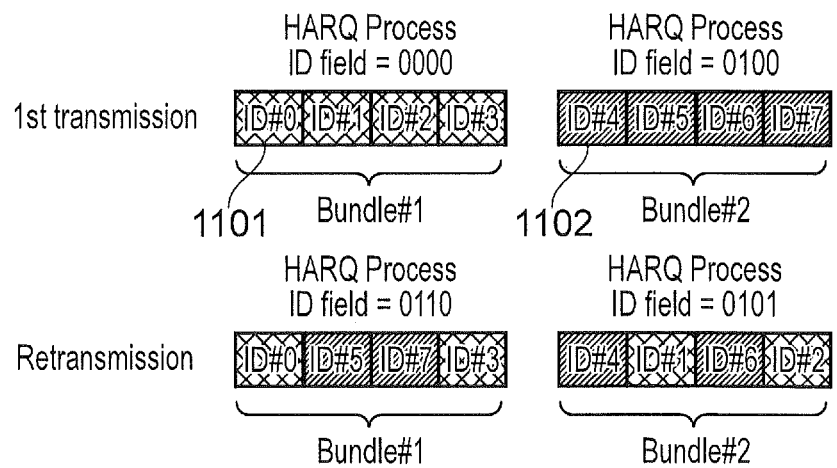
FIG. 12 illustrates the HARQ Process ID field being reused for a swap HARQ process indicator in accordance with embodiments of the present technique.

An example of reusing the HARQ Process ID field is shown in FIG. 12, where in the $1^{st}$ transmission, the HARQ Process ID field is used to indicate the HARQ Process ID of the $1^{st}$ PDSCH in the bundle and here for Bundle #1 it is used to indicate 1101 ID #0 whilst that in Bundle #2 indicates 1102 ID #4. If both Bundle #1 & Bundle #2 require retransmission, then the HARQ Process ID fields are used to indicate which HARQ Process has been swapped. Here we swap HARQ Process ID #1 & ID #2 of Bundle #1 with HARQ Process ID #5 and ID #7 of Bundle #2 and the corresponding bitmap for Bundle #1 and Bundle #2 are 0110 and 0101 respectively.

Figure 13:
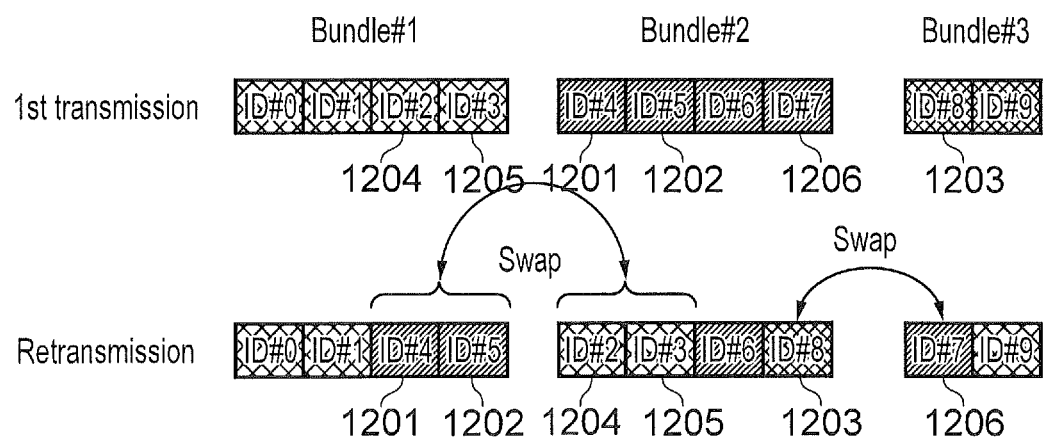
FIG. 13 illustrates an example of implicit HARQ process swaps in accordance with embodiments of the present technique.

In another embodiment using the single DCI method, the Swap HARQ Process is implicitly determined. An example is to swap the $2^{nd}$ half of a bundle with the $1^{st}$ half of the following bundle as shown in FIG. 13. Here Bundle #1 consists of 4 PDSCHs (HARQ Process ID #0, ID #1, ID #2 & ID #3), Bundle #2 consists of 4 PDSCHs (HARQ Process ID #4, ID #5, ID #6 & ID #7) and Bundle #3 consists of 2 PDSCHs (HARQ Process ID #8 & ID #9). The $2^{nd}$ half of Bundle #1 consists of HARQ Process ID #2 1204 & ID #3 1205 which will be swapped with the $1^{st}$ half of Bundle #2 which consists of HARQ Process ID #4 1201 & ID #5 1202. Although the $2^{nd}$ half of Bundle #2 consists of HARQ Process ID #6 & ID #7, Bundle #3 $1^{st}$ half consists of only HARQ Process ID #8. In this embodiment, the smaller half of the two bundles are swapped, i.e. HARQ Process ID #7 1206 of Bundle #2 is swapped with HARQ Process ID #8 1203 of Bundle #1. It should be appreciated that other orders of swap are also possible e.g. $1^{st}$ half of $1^{st}$ bundle swap with $1^{st}$ half of $2^{nd}$ bundle or $1^{st}$ half of $1^{st}$ bundle swap with $2^{nd}$ half of $2^{nd}$ bundle. This implicit rule of bundle swapping can be specified in the specifications or configured by the network.

In other words, in embodiments of the present technique, the infrastructure equipment is configured to transmit a data channel swap indicator in each of the control channels when a retransmission of the data is scheduled, the data channel swap indicator indicating which of the data channels of the bundle scheduled by the each of the control channels should be swapped. This data channel swap indicator may be transmitted to the communications device (UE).

In some embodiments of the present technique, the second bundle is not transmitted in the first repetition of the time units, whilst the first bundle is. In this case, the swapping between the bundles comprises swapping between a bundle due for transmission and a bundle due for re-transmission. In other words, the infrastructure equipment is configured to swap one or more of the data channels of the first bundle with one or more of the data channels of the second bundle, wherein the second bundle has not yet been transmitted to the communications device.

In some embodiments of the present technique, the number of data channels or HARQ processes swapped between bundles may be the same, or they may be different. For example, the first bundle may exchange three data channels/HARQ processes for two data channels/HARQ processes from the second bundle. In other words, a number of data channels swapped out of a bundle is equal to the number of data channels swapped into the bundle, or a number of data channels swapped out of a bundle is different to the number of data channels swapped into the bundle.

Figure 14:
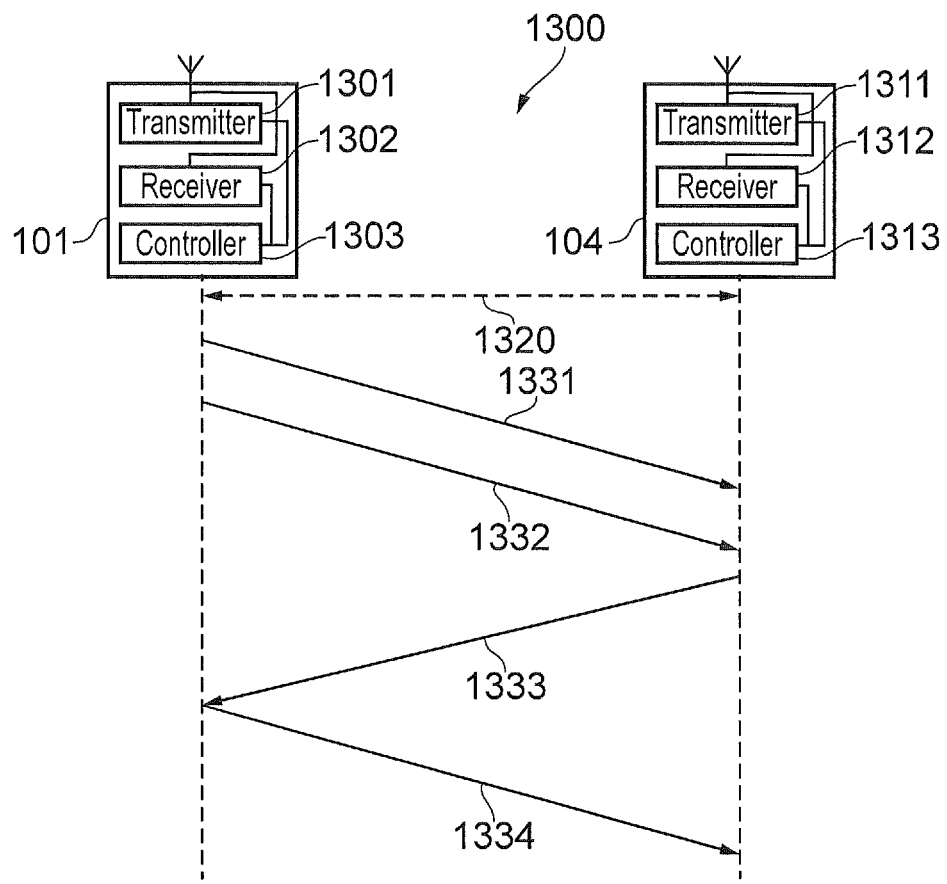
FIG. 14 shows a part schematic, part message flow diagram describing an infrastructure equipment, a communications device and a wireless telecommunications system comprising the infrastructure equipment and the communications device in accordance with embodiments of the present technique.

FIG. 14 shows a part schematic, part message flow diagram describing an infrastructure equipment, communications device and a wireless telecommunications system comprising the infrastructure equipment and the communications device in accordance with embodiments of the present technique. FIG. 14 illustrates wireless telecommunications system 1300 comprising an infrastructure equipment 101, a communications device 104, and a wireless access interface 1320 between the infrastructure equipment 101 and the communications device 104. Both the infrastructure equipment 101 and the communications device 104 comprise transmitter circuitry 1301, 1311 for transmitting signals representing data via the wireless access interface 1320, receiver circuitry 1302, 1312 for receiving signals representing data via the wireless access interface 1320, and controller circuitry 1303, 1313 configured to control the transmitter circuitry 1301, 1311 and the receiver circuitry 1302, 1312 to transmit and receive signals via the wireless access interface 1320 in accordance with a time divided structure in which the wireless access interface 1320 is divided into a plurality of repeating time units, wherein the controller circuitry 1303 of the infrastructure equipment 101 is configured in combination with the transmitter circuitry 1301 of the infrastructure equipment 101 and receiver circuitry 1302 of the infrastructure equipment 101 to transmit 1331, in a first repetition of the time units, a plurality of control channels configured to schedule a plurality of data channels configured to carry data, the data channels being divided into a plurality of bundles each comprising a plurality of the data channels, to transmit 1332, in the first repetition of the time units, one or more of the plurality of bundles, and to re-transmit 1334 the data, in a second repetition of the time units, for at least a first of the bundles and a second of the bundles, one or more of the data channels of the first of the bundles being swapped for re-transmission with one or more of the data channels of the second of the bundles.

Such a time divided structure as described above is shown in each of FIGS. 2 to 10. Each frame consists of ten subframes, or time units, (0 to 9), and these are repeating time units in the sense of there being multiple successive radio frames, i.e. subframe #0 in FIG. 4 is unused in the first frame, but in the second frame, in subframe #0, UL to DL switching 302 for the receiving device takes place.

In FIG. 14 the transmitter circuitry 1301, 1311 may include analogue and digital circuitry such as radio frequency circuits and filters, analogue amplifiers as well as digital signalling processing software implemented as application specific semiconductor circuits, dedicated signalling processing logic and other processors. Similarly the receiver circuitry 1302, 1312 may include radio frequency circuitry and filters, signal processing software in the form of digital signal processors and other devices for detecting signals. The controller circuitry 1303, 1313 may be formed from processors executing software, application specific semiconductor circuits or hardware circuits comprising digital logic. In some examples the controller circuitry 1303 of the eNodeB 101 can include a so-called "scheduler" which schedules the transmission of signals and the reception of signals via the wireless access interface.

In some embodiments, the controller circuitry 1303 of the infrastructure equipment 101 is configured to control the receiver circuitry 1302 of the infrastructure equipment to receive 1333 from the communications device 104 a negative acknowledgement for each of one or more of the bundles indicating that one or more of the data channels of each of the plurality of bundles for which the negative acknowledgement was received has not been successfully received by the communications device, wherein the bundles for which the negative acknowledgement was received comprises the first bundle and the second bundle.

Figure 15:
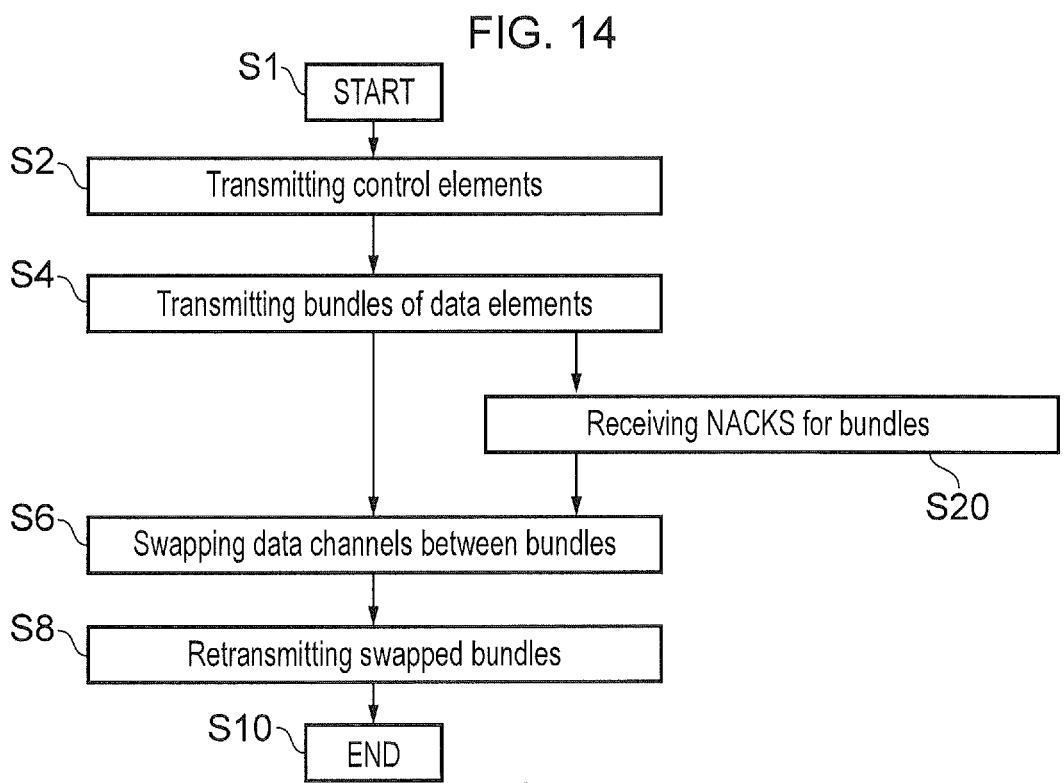
FIG. 15 shows a flow diagram describing a method in accordance with embodiments of the present technique.

FIG. 15 shows a flow diagram describing a method in accordance with embodiments of the present technique, where the process entails a method of controlling communications in a wireless telecommunications system comprising an infrastructure equipment. The method begins in step S1. In step S2, the process comprises transmitting, in a first repetition of the time units, a plurality of control channels configured to schedule a plurality of data channels configured to carry data, the data channels being divided into a plurality of bundles each comprising a plurality of the data channels. In step S4, the method comprises transmitting, in the first repetition of the time units, one or more of the plurality of bundles. The method continues to step S6, which comprises swapping, for at least a first of the bundles and a second of the bundles, one or more of the data channels of the first of the bundles with one or more of the data channels of the second of the bundles, before, in step S8, re-transmitting the data, comprising the swapped bundles, in a second repetition of the time units. The process ends in step S10.

In some embodiments, and as shown in FIG. 15, following step S4, the process advances to step S20, which comprises receiving a negative acknowledgement for each of one or more of the bundles indicating that one or more of the data channels of each of the plurality of bundles for which the negative acknowledgement was received has not been successfully received, wherein the bundles for which the negative acknowledgement was received comprises the first bundle and the second bundle. Following step S20, the process continues into steps S6, S8 and S10 as described above.

Embodiments of the present disclosure therefore address issues with existing HD-FDD mechanisms and provide a new mechanism with increased efficiency and less restriction on eNB scheduling, which can be used to improve performance and efficiency of MTC or IoT devices, and further reduce the retransmission inefficiency of HARQ-ACK bundling.

The following numbered paragraphs provide further example aspects and features of the present technique:

Paragraph 1. An infrastructure equipment forming part of a wireless telecommunications system, the infrastructure equipment comprising transmitter circuitry for transmitting signals representing data via a wireless access interface of the wireless telecommunications system to a communications device, receiver circuitry for receiving signals representing data via the wireless access interface from the communications device, and controller circuitry configured to control the transmitter circuitry and the receiver circuitry to transmit and receive signals via the wireless access interface in accordance with a time divided structure in which the wireless access interface is divided into a plurality of repeating time units, wherein the controller circuitry is configured in combination with the transmitter circuitry and receiver circuitry to transmit, in a first repetition of the time units, a plurality of control channels configured to schedule a plurality of data channels configured to carry data, the data channels being divided into a plurality of bundles each comprising a plurality of the data channels, to transmit, in the first repetition of the time units, one or more of the plurality of bundles, and to re-transmit the data, in a second repetition of the time units, for at least a first of the bundles and a second of the bundles, one or more of the data channels of the first of the bundles being swapped for re-transmission with one or more of the data channels of the second of the bundles.

Paragraph 2. An infrastructure equipment according to Paragraph 1, wherein the controller circuitry is configured to control the receiver circuitry to receive from the communications device a negative acknowledgement for each of one or more of the bundles indicating that one or more of the data channels of each of the plurality of bundles for which the negative acknowledgement was received has not been successfully received by the communications device, wherein
the bundles for which the negative acknowledgements were received comprises the first bundle and the second bundle.

Paragraph 3. An infrastructure equipment according to Paragraph 1 or Paragraph 2, wherein each of the control channels is configured to schedule the plurality of the data channels of one of the bundles of data channels.

Paragraph 4. An infrastructure equipment according to any of Paragraphs 1 to 3, wherein the controller circuitry is configured in combination with the transmitter circuitry to transmit a bundle identifier in one of the control channels, the bundle identifier being associated with one of the bundles.

Paragraph 5. An infrastructure equipment according to any of Paragraphs 1 to 4, wherein the controller circuitry is configured in combination with the transmitter circuitry to transmit a bundle swap identifier in one of the control channels, the bundle swap identifier being associated with the second bundle, wherein the one of the control channels is configured to schedule the plurality of data channels of the first bundle.

Paragraph 6. An infrastructure equipment according to Paragraph 5, wherein the controller circuitry is configured in combination with the transmitter circuitry to transmit one or more further bundle swap identifiers in the one of the control channels, the one or more further bundle swap identifiers each being associated with one of the bundles which is not scheduled by the one of the control channels.

Paragraph 7. An infrastructure equipment according to any of Paragraphs 1 to 6, wherein the controller circuitry is configured in combination with the transmitter circuitry to transmit a data channel swap indicator in each of the control channels, the data channel swap indicator indicating which of the data channels of the bundle scheduled by the each of the control channels should be swapped.

Paragraph 8. An infrastructure equipment according to any of Paragraphs 1 to 7, wherein the controller circuitry is configured in combination with the transmitter circuitry and receiver circuitry to swap one or more of the data channels of the first bundle with one or more of the data channels of the second bundle and one or more data channels of a third of the bundles.

Paragraph 9. An infrastructure equipment according to any of Paragraphs 1 to 8, wherein a number of data channels swapped out of a bundle is equal to the number of data channels swapped into the bundle.

Paragraph 10. An infrastructure equipment according to any of Paragraphs 1 to 8, wherein a number of data channels swapped out of a bundle is different to the number of data channels swapped into the bundle.

Paragraph 11. An infrastructure equipment according to any of Paragraphs 1 to 10, wherein the controller circuitry is configured in combination with the transmitter circuitry and receiver circuitry to swap one or more of the data channels of the first bundle with one or more of the data channels of the second bundle, wherein the second bundle has not yet been transmitted to the communications device.

Paragraph 12. A method of controlling communications at an infrastructure equipment forming part of a wireless telecommunications system, the method comprising controlling transmitter circuitry of the infrastructure equipment and receiver circuitry of the infrastructure equipment to transmit and to receive signals via a wireless access interface of the wireless telecommunications system in accordance with a time divided structure in which the wireless access interface is divided into a plurality of repeating time units, the controlling the transmitter circuitry and receiver circuitry comprising transmitting, in a first repetition of the time units, a plurality of control channels configured to schedule a plurality of data channels configured to carry data, the data channels being divided into a plurality of bundles each comprising a plurality of the data channels, transmitting, in the first repetition of the time units, one or more of the plurality of bundles, and re-transmitting the data, in a second repetition of the time units, for at least a first of the bundles and a second of the bundles, one or more of the data channels of the first of the bundles being swapped for re-transmission with one or more of the data channels of the second of the bundles.

Paragraph 13. A method according to Paragraph 12, wherein the method comprises receiving at the infrastructure equipment from the communications device a negative acknowledgement for each of one or more of the bundles indicating that one or more of the data channels of each of the plurality of bundles for which the negative acknowledgements were received has not been successfully received by the communications device, wherein the bundles for which the negative acknowledgement was received comprises the first bundle and the second bundle.

Paragraph 14. A method according to Paragraph 12 or Paragraph 13, wherein each of the control channels schedules the plurality of the data channels of one of the bundles of data channels.

Paragraph 15. A wireless telecommunications system comprising an infrastructure equipment, a communications device, and a wireless access interface between the infrastructure equipment and the communications device, the infrastructure equipment comprising transmitter circuitry for transmitting signals representing data via the wireless access interface to the communications device, receiver circuitry for receiving signals representing data via the wireless access interface from the communications device, and controller circuitry configured to control the transmitter circuitry and the receiver circuitry to transmit and receive signals via the wireless access interface in accordance with a time divided structure in which the wireless access interface is divided into a plurality of repeating time units, wherein the controller circuitry is configured in combination with the transmitter circuitry and receiver circuitry to transmit, in a first repetition of the time units, a plurality of control channels configured to schedule a plurality of data channels configured to carry data, the data channels being divided into a plurality of bundles each comprising a plurality of the data channels, to transmit, in the first repetition of the time units, one or more of the plurality of bundles, and to re-transmit the data, in a second repetition of the time units, for at least a first of the bundles and a second of the bundles, one or more of the data channels of the first of the bundles being swapped for re-transmission with one or more of the data channels of the second of the bundles.

Paragraph 16. Circuitry for an infrastructure equipment forming part of a wireless telecommunications system, the infrastructure equipment comprising transmitter circuitry for transmitting signals representing data via a wireless access interface of the wireless telecommunications system to a communications device, receiver circuitry for receiving signals representing data via the wireless access interface from the communications device, and controller circuitry configured to control the transmitter circuitry and the receiver circuitry to transmit and receive signals via the wireless access interface in accordance with a time divided structure in which the wireless access interface is divided into a plurality of repeating time units, to transmit, in a first repetition of the time units, a plurality of control channels configured to schedule a plurality of data channels configured to carry data, the data channels being divided into a plurality of bundles each comprising a plurality of the data channels, to transmit, in the first repetition of the time units, one or more of the plurality of bundles, and to re-transmit the data, in a second repetition of the time units, for at least a first of the bundles and a second of the bundles, one or more of the data channels of the first of the bundles being swapped for re-transmission with one or more of the data channels of the second of the bundles.

Paragraph 17. A communications device forming part of a wireless telecommunications system, the communications device comprising transmitter circuitry for transmitting signals representing data via a wireless access interface of the wireless telecommunications system to an infrastructure equipment of the wireless telecommunications system, receiver circuitry for receiving signals representing data via the wireless access interface from the infrastructure equipment, and controller circuitry configured to control the transmitter circuitry and the receiver circuitry to transmit and receive signals via the wireless access interface in accordance with a time divided structure in which the wireless access interface is divided into a plurality of repeating time units, wherein the controller circuitry is configured in combination with the transmitter circuitry and receiver circuitry to receive a transmission, in a first repetition of the time units, one or more bundles each comprising a plurality of data channels configured to carry data, and to receive a re-transmission, in a second repetition of the time units, for at least a first of the bundles and a second of the bundles, one or more of the data channels of the first of the bundles being swapped for re-transmission by the infrastructure equipment with one or more of the data channels of the second of the bundles.

Paragraph 18. A communications device according to Paragraph 17, wherein the controller circuitry is configured to control the transmitter circuitry and the receiver circuitry, to detect that one or more of the data channels of each of one or more of the bundles has not been successfully received, and to transmit to the infrastructure equipment a negative acknowledgement for each of the one or more of the bundles, wherein the bundles for which the negative acknowledgements were transmitted comprises the first bundle and the second bundle.

Paragraph 19. A communications device according to any of Paragraphs 17 or 18, wherein the controller circuitry is configured in combination with the receiver circuitry to receive a bundle identifier from the infrastructure equipment, the bundle identifier being associated with one of the bundles.

Paragraph 20. A communications device according to any of Paragraphs 17 to 19, wherein the controller circuitry is configured in combination with the receiver circuitry to receive a bundle swap identifier from the infrastructure equipment, the bundle swap identifier being associated with the second bundle.

Paragraph 21. A communications device according to Paragraph 20, wherein the controller circuitry is configured in combination with the receiver circuitry to receive one or more further bundle swap identifiers from the infrastructure equipment, the one or more further bundle swap identifiers each being associated with one of the bundles, the one of the bundles not being the first bundle or the second bundle.

Paragraph 22. A communications device according to any of Paragraphs 17 to 21, wherein the controller circuitry is configured in combination with the receiver circuitry to receive a data channel swap indicator from the infrastructure equipment, the data channel swap indicator indicating which of the data channels of the one or more bundles should be swapped.

Numerous modifications and variations of the present disclosure are possible in light of the above teachings. It is therefore to be understood that within the scope of the appended claims, the disclosure may be practiced otherwise than as specifically described herein.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

REFERENCES

[1] LTE for UMTS: OFDMA and SC-FDMA Based Radio Access, Harris Holma and Antti Toskala, Wiley 2009, ISBN 978-0-470-99401-6.

[2] RP-161324, "New work item proposal: Enhancements of NB-IoT," Vodafone, Huawei, HiSilicon, Ericsson, Qualcomm, RAN #72.

[3] RP-161321, "New WI proposal on Further Enhanced MTC", Ericsson, RAN #72.

[4] R1-166660 "Higher data rate for feMTC," Sony, RAN1 #86.

[5] R1-167352, "Views on techniques to improve the data rate for Rel-14 MTC," NTT DOCOMO, RAN1 #86.

[6] R1-081373, "Explicit DTX Signaling with ACK/NAK Bundling in TDD," Texas Instruments, Huawei, RAN1 #52bis.

[7] R1-1610390, "HARQ-ACK bundling for MTC," Ericsson, RAN1 #86bis.

What is claimed is:

1. An infrastructure equipment forming part of a wireless telecommunications system, the infrastructure equipment comprising:

transmitter circuitry for transmitting signals representing data via a wireless access interface of the wireless telecommunications system to a communications device, receiver circuitry for receiving signals representing data via the wireless access interface from the communications device, and controller circuitry configured to control the transmitter circuitry and the receiver circuitry to transmit and receive signals via the wireless access interface in accordance with a time divided structure in which the wireless access interface is divided into a plurality of repeating tune units, wherein the controller circuitry is configured in combination with the transmitter circuitry and receiver circuitry to transmit, in a first repetition of the time units, a plurality of control channels configured to schedule a plurality of successive data channels configured to carry data, the successive data channels being divided into a plurality of bundles each comprising a plurality of the successive data channels, transmit in the first repetition of the time units, one or more of the plurality of bundles, and re-transmit, in a second repetition of the time units, the plurality of control channels for at least a first of the bundles and a second of the bundles, wherein for the re-transmission of the plurality of control channels one or more of the data channels of the first of the bundles is swapped with one or more of the data channels of the second of the bundles such that the first of the bundles associated with the re-transmission includes said one or more data channels previously in the second of the bundles and such that the second of the bundles associated swith the re-transmission includes said one or more data channels previously in the first of the bundles.

2. An infrastructure equipment according to claim 1, wherein the controller circuitry is configured to control the receiver circuitry to receive from the communications device a negative acknowledgement for each of one or more of the bundles indicating that one or more of the data channels of each of the plurality of bundles for which the negative acknowledgement was received has not been successfully received by the communications device, wherein the bundles for which the negative acknowledgements were received comprises the first bundle and the second bundle.

3. An infrastructure equipment according to claim 1, wherein each of the control channels is configured to schedule the plurality of the data channels of one of the bundles of data channels.

4. An infrastructure equipment according to claim 1, wherein the controller circuitry is configured in combination with the transmitter circuitry to transmit a bundle identifier in one of the control channels, the bundle identifier being associated with one of the bundles.

5. An infrastructure equipment according to claim 1, wherein the controller circuitry is configured in combination with the transmitter circuitry to transmit a bundle swap identifier in one of the control channels, the bundle swap identifier being associated with the second bundle, wherein the one of the control channels is configured to schedule the plurality of data channels of the first bundle.

6. An infrastructure equipment according to claim 5, wherein the controller circuitry is configured in combination with the transmitter circuitry to transmit one or more further bundle swap identifiers in the one of the control channels, the one or more further bundle swap identifiers each being associated with one of the bundles which is not scheduled by the one of the control channels.

7. An infrastructure equipment according to claim 1, wherein the controller circuitry is configured in combination with the transmitter circuitry to transmit a data channel swap indicator in each of the control channels, the data channel swap indicator indicating which of the data channels of the bundle scheduled by the each of the control channels should be swapped.

8. An infrastructure equipment according to claim 1, wherein the controller circuitry is configured in combination with the transmitter circuitry and receiver circuitry to swap one or more of the data channels of the first bundle with one or more of the data channels of the second bundle and one or more data channels of a third of the bundles.

9. An infrastructure equipment according to claim 1, wherein a number of data channels swapped out of a bundle is equal to the number of data channels swapped into the bundle.

10. An infrastructure equipment according to claim 1, wherein a number of data channels swapped out of a bundle is different to the number of data channels swapped into the bundle.

11. An infrastructure equipment according to claim 1, wherein the controller circuitry is configured in combination with the transmitter circuitry and receiver circuitry to swap one or more of the data channels of the first bundle with one or more of the data channels of the second bundle, wherein the second bundle has not yet been transmitted to the communications device.

12. A method of controlling communications at an infrastructure equipment forming part of a wireless telecommunications system, the method comprising controlling transmitter circuitry of the infrastructure equipment and receiver circuitry of the infrastructure equipment to transmit and to receive signals via a wireless access interface of the wireless telecommunications system in accordance with a time divided structure in which the wireless access interface is divided into a plurality of repeating time units, the controlling the transmitter circuitry and receiver circuitry comprising:

transmitting, in a first repetition of the time units, a plurality of control channels configured to schedule a plurality of data channels configured to carry data, the data channels being divided into a plurality of bundles each comprising a plurality of the data channels, transmitting, in the first repetition of the time units, one or more of the plurality of bundles, and re-transmitting the data, in a second repetition of the time units, for at least a first of the bundles and a second of the bundles, one or more of the data channels of the first of the bundles being swapped for re-transmission with one or more of the data channels of the second of the bundles, wherein said transmitting includes transmitting a data channel swap indicator in each of the control channels, the data channel swap indicator indicating which of the data channels of the bundle scheduled by the each of the control channels should be swapped.

13. A method according to claim 12. wherein the method comprises receiving at the infrastructure equipment from the communications device a negative acknowledgement for each of one or more of the bundles indicating that one or more of the data channels of each of the plurality of bundles for which the negative acknowledgements were received has not been successfully received by the communications device, wherein the bundles for which the negative acknowledgement was received comprises the first bundle and the second bundle.

14. A method according to claim 12, wherein each of the control channels schedules the plurality of the data channels of one of the bundles of data channels.

15. A communications device forming part of a wireless telecommunications system, the communications device comprising:

transmitter circuitry for transmitting signals representing data via a wireless access interface of the wireless telecommunications system to an infrastructure equipment of the wireless telecommunications system, receiver circuitry for receiving signals representing data via the wireless access interface from the infrastructure equipment, and controller circuitry configured to control the transmitter circuitry and the receiver circuitry to transmit and receive signals via the wireless access interface in accordance with a time divided structure in which the wireless access interface is divided into a plurality of repeating time units, wherein the controller circuitry is configured in combination with the transmitter circuitry and receiver circuitry to receive a transmission, in a first repetition of the time units, one or more bundles each comprising a plurality of data channels configured to carry data, and receive a re-transmission, in a second repetition of the time units, for at least a first of the bundles and a second of the bundles, one or more of the data channels of the first of the bundles being swapped for re-transmission by the infrastructure equipment with one or more of the data channels of the second of the bundles, wherein the controller circuitry is configured in combination with the receiver circuitry to receive a bundle swap identifier from the infrastructure equipment, the bundle swap identifier being associated with the second bundle.

16. A communications device according to claim 15, wherein the controller circuitry is configured to control the transmitter circuitry and the receiver circuitry, detect that one or more of the data channels of each of one or more of the bundles has not been successfully received, and transmit to the infrastructure equipment a negative acknowledgement for each of the one or more of the bundles, wherein the bundles for which the negative acknowledgements were transmitted comprises the first bundle and the second bundle.

17. A communications device according to claim 15, wherein the controller circuitry is configured in combination with the receiver circuitry to receive a bundle identifier from the infrastructure equipment, the bundle identifier being associated with one of the bundles.

18. A communications device according to claim 15, wherein the controller circuitry is configured in combination with the receiver circuitry to receive a data channel swap indicator from the infrastructure equipment, the data channel swap indicator indicating which of the data channels of the one or more bundles should. be swapped.

19. A communications device according to claim 15, wherein the controller circuitry is configured in combination with the transmitter circuitry and receiver circuitry to detect that one or more of the data channels of each of one or more of the bundles in either the transmission or the re-transmission has been successfully received, and to transmit an acknowledgement of successful reception of the one or more data channels of each of one or more of the bundles which have been successfully received in either the transmission or the re-transmission.

\* \* \* \* \*